United States Patent [19]

Csaszar et al.

[11] Patent Number: 4,500,475
[45] Date of Patent: Feb. 19, 1985

[54] CARBURETION SYSTEM

[76] Inventors: Gabor Csaszar, 8414 Russell Dr., Cary, Ill. 60013; Gernot F. Oehley, 6650 Harts Rd., Niles, Ill. 60648; Fred M. Goldman, 624 Huber Ln., Glenview, Ill. 60025

[21] Appl. No.: 556,462

[22] Filed: Nov. 30, 1983

[51] Int. Cl.$^3$ .............................................. F02M 27/08
[52] U.S. Cl. ............................... 261/36 A; 261/81; 261/DIG. 48; 123/537
[58] Field of Search ............... 261/DIG. 48, 36 A, 96, 261/81; 123/537

[56] References Cited

U.S. PATENT DOCUMENTS

| | | | |
|---|---|---|---|
| 3,005,486 | 10/1961 | Donnell | 261/36 A |
| 3,155,141 | 11/1964 | Doyle et al. | 261/DIG. 48 |
| 3,336,734 | 8/1967 | Schultz | 261/96 |
| 3,756,575 | 9/1973 | Cottell | 261/DIG. 48 |
| 4,029,064 | 6/1977 | Csaszar et al. | 261/DIG. 48 |
| 4,280,968 | 7/1981 | Smeets | 261/16 |
| 4,401,089 | 8/1983 | Csaszar et al. | 123/537 |

FOREIGN PATENT DOCUMENTS 45-17485  6/1970  Japan .......................... 261/DIG. 48

*Primary Examiner*—Tim Miles
*Attorney, Agent, or Firm*—Allegretti, Newitt, Witcoff & McAndrews

[57] ABSTRACT

A combination gas vaporizer-air filter comprising a housing fuel supply means for fluid to be vaporized and an ultrasonic transducer in the housing for vaporizing fluid from said fuel supply means, air inlet means in the housing, outlet means in the housing and air filter in the housing adjacent the air inlet means. The vaporized fluid and air in the housing being intimately mixed prior to discharge from the outlet means, duct means connecting said housing to the intake manifold of an internal combustion engine. The outlet means communicate with the duct means, whereby the mixture or vaporized fluid and air may pass from the outlet means to said duct and then to said intake manifold.

9 Claims, 1 Drawing Figure ved embodiment of the present invention wherein:

CARBURETION SYSTEM

BACKGROUND OF THE INVENTION

This invention relates to a combination carburetor-air filter for an internal combustion engine and, more particularly, to a combination carburetor-air filter which incorporates ultrasonic transducer means for vaporizing the fuel supplied to the internal combustion engine.

Ordinarily, an internal combustion engine is provided with a carburetor in communication with the intake manifold of the internal combustion engine. Atop the carburetor is an air filter. Ambient air is drawn through the air filter to the carburetor, where it is mixed with fuel and the controlled air-fuel mixture is supplied to the cylinders in the internal combustion engine. To applicants' knowledge, no one has combined an air filter and a carburetor with an ultrasonic transducer means into a single device.

An object of the present invention is to combine the air filter and carburetion means for an internal combustion engine into a compact unit that occupies no more space than the air filter.

Another object of the present invention is to provide a compact air filter which incorporates ultrasonic transducer means therein for vaporizing the fuel.

Yet another object of the present invention is to provide a compact air filter-carburetion means incorporating interchangeable bodies therein for adapting the air filter-carburetion means to different sizes and configurations of manifold openings in internal combustion engines.

Other objects and advantages of the present invention will be made more apparent hereinafter.

BRIEF DESCRIPTION OF THE DRAWING

There is shown in the attached drawing a presently preferred embodiment of the present invention wherein.

DETAILED DESCRIPTION OF THE PRESENT INVENTION

Figure 1:
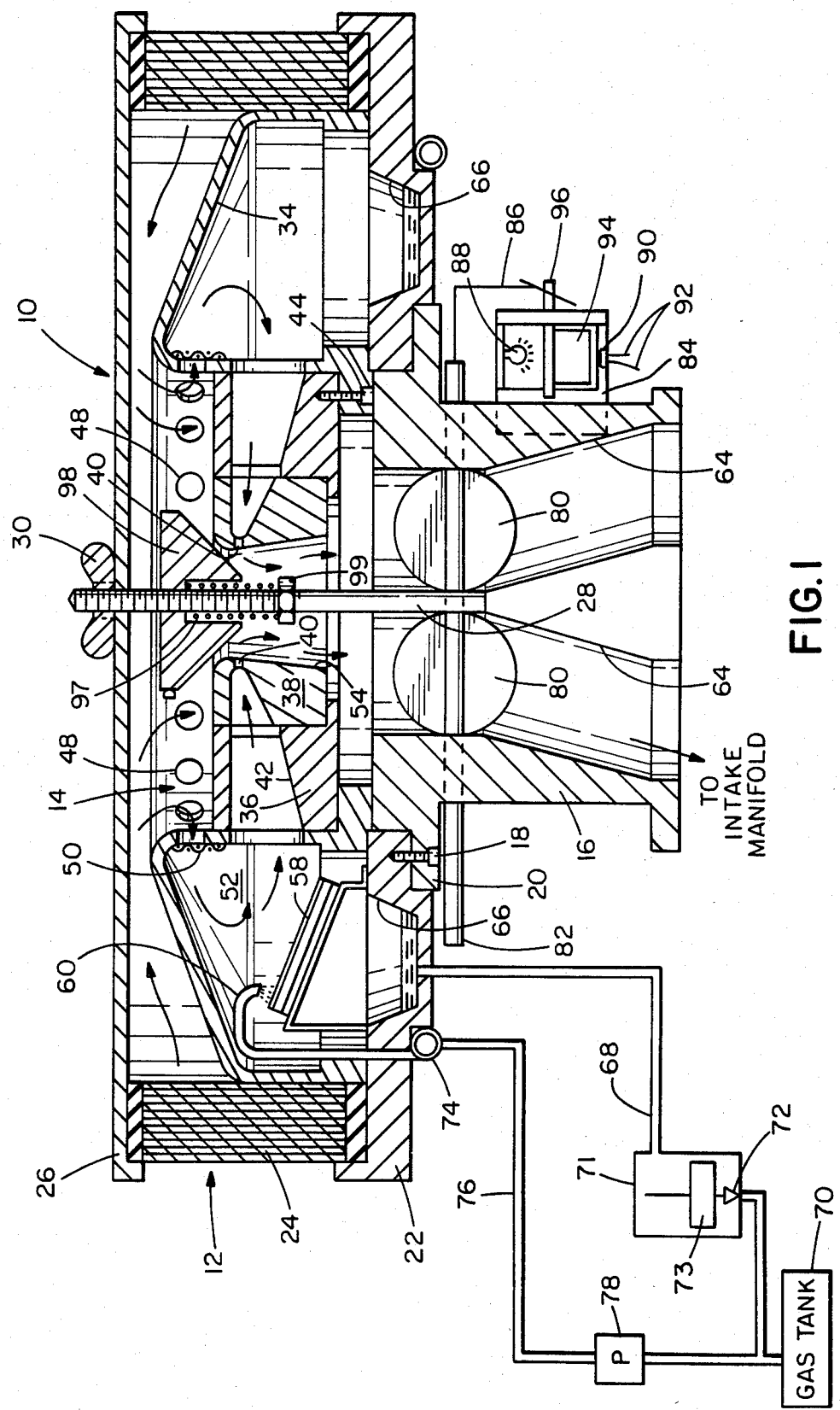
FIG. 1 is a cross-sectional view of a combination air filter carburetor or gas vaporizer embodying the present invention.

There is shown in the attached drawing a presently preferred embodiment of the present invention wherein the numeral 10 denotes the combination gas vaporizer-air filter. The device 10 is comprised of an air filter 12 surrounding and enclosing a gas vaporizer or carburetion means 14. The device 10 is secured by suitable fastening means to a throttle body 16 that is in turn connected to the intake manifold of an internal combustion engine. As shown, the fastening means may comprise screws 18 extending through holes in the flange 20 at the top of the throttle body 16 into the bottom or base plate of the air filter 12.

The air filter 12 comprises a bottom or base plate 22, a filter element 24 and a top or cover 26. Extending upwardly from the throttle body 16 is a stud 28, which is threaded at the upper end for receiving a wing nut 30. The wing nut 30 is threaded onto the stud 28 to retain the components of air filter 12 in assembled relationship.

The carburetion means or gas vaporizer 14 comprises a gas collector housing 34, a venturi housing 36 disposed within the gas collector housing 34 and a venturi 38 having venturi openings 40 communicating with openings 42 through the venturi housing 36. The gas collector housing 34 is secured to the venturi housing 36 by suitable fastening means, for example, screws 44.

Provided in the gas collector housing 34 are a plurality of openings or ports 48 for permitting the passage of air from about the gas collector housing 34 into the gas collector housing 34. The air passes through filter 24 and ports 48 in the collector housing 34 and through screen 50 on the downstream side of ports 48 to annual chamber 52. The air passes through annular chamber 52, through openings 42 in venturi housing 36 and through venturi openings 40 in venturi 38 into a central opening 54 in the venturi 38.

Disposed in chamber 52 are a plurality of ultrasonic transducers 58 for vaporizing fuel received from nozzle 60. Each transducer includes a crystal operable at a range of at least 1,000,000 Hz and a resonator operatively connected to said crystal for vibration by same. The resonator is tuned to the frequency of said crystal. Further details of construction may be found in U.S. Pat. No. 4,401,089 granted Aug. 30, 1983, which is incorporated herein by reference.

The function of the transducer 58 is to completely vaporize fuel received from the nozzle 60 on the upper surface of the ultrasonic transducer. Fuel is discharged from nozzle 60 onto the uppermost edge of the transducer so that fluid will flow over the entire upper surface to maximize vaporization. The resultant mist of fuel, e.g. gasoline, is picked up by the air stream flowing through the chamber 52. The air-fuel mixture is carried through openings 42 and 40 into central opening 54. From the central opening 54, the air fuel mixture passes through passages 64 in the throttle body 16 to the intake manifold.

A fuel reservoir 66 is provided in the base plate 22 for receiving excess liquid fuel from the ultrasonic transducers 58. Preferably, the transducers 58 are disposed at an angle to the horizontal to prevent flooding or liquid accumulation on the active surface of the transducer 58. Misting is enhanced by passage of a film of liquid fuel over the active surface of the transducer by the nozzle 60.

A line 68 extends from the reservoir 66 to return excess fuel from the reservoir to the valve housing 71. A float valve 72 is disposed in line 68 to prevent air from entering pump 68 when reservoir 66 is dry. The valve 72 is closed when there is little or no liquid in the valve housing 71. As liquid accumulates in valve housing 71, the float 73 will rise and valve 72 will be opened. Fuel may then flow from valve housing 71 through line 75 back to the pump 78. Each nozzle 60 communicates with a header 74 which communicates with the gas tank 70 through line 76. Within line 76 is a pump 78. Pump 78 draws liquid from the gas tank 70 and from the valve housing 71 and forces it through line 76 to header 74. The pressurized liquid is forced from header 74 through each nozzle 60 onto an associated transducer 58. The transducers 58 and nozzle 60 are equidistantly spaced in the device 10 and the number of transducers 58 used will be based upon the engine specifications. For example, a similar transducer used in a product, known commercially as the Fueltron 7100 will vaporize enough fuel to drive up to 20 horsepower. Thus, five of these transducers 58 would be needed for a 100 horsepower engine and eight transducers would be needed for a 160 horsepower engine.

It will be understood that in one embodiment, a device 10 with eight transducers, only one or two crystals or transducers would be operating at idle to vaporize fuel. During acceleration of the engine, all eight crystals would be operative. During normal driving operation, three or four crystals would be operative. An electronic control circuit (not shown) is coupled to the crystals to control the appropriate operation thereof.

Within each passage or duct 64 communicating the device 10 to the air intake manifold is a butterfly valve 80. The identical valves 80 are connected to a shaft 82 journalled in the throttle body 16. The shaft 82 is operatably connected to the sensor 84 by means of linkage 86. Within the sensor 84 is a light source 88 directed toward a photocell 90 which is connected by leads 92 to a micro-processor or micro-computer for controlling the power to the crystal of the transducer 58. Within the sensor 84 is a shield or flapper 94 which is movable in response to rotation of the shaft 96 to control the light reaching photocell 90 from light source 88. From the foregoing, it is believed evident that the shaft 82 is movable responsive to the movement of the valves 80 to properly position linkage 86 and shaft 96 connected thereto so as to suitably control the light reaching the photocell 90 from the light source 88 and therefore control the power to the crystal of each transducer. At engine idle, crystal power is reduced and during acceleration crystal power is increased to increase vaporization of the fuel.

Ordinarily, on engines equipped with a catalytic convertor, the catalytic convertor will cut off at 40–50% of full engine power. Essentially, at high engine speeds, on the order of 55 MPH, the catalytic convertor is less effective and at higher speeds it may cut out entirely, with the result that pollutants are discharged to the atmosphere. The engine equipped with a catalytic convertor does not run clean during all operating conditions. With the present invention, the engine will run clean regardless of engine load.

A high-speed cone 98 is movable on the stud 28 to open and close the port or central opening defined in the venturi 38. The high-speed cone valve 98 is biased upwardly away from the venturi 38 by spring 97 secured between the nut 99 and the high-speed cone valve 98. The nut 99 is adjustable on the stud 28 to regulate the puressure of the spring 97 upon the high-speed cone 98. At high speed, the port 54 will be closed by the high-speed cone 98. Air entering the device 10 through filter 24 will flow through the ports 48 into chamber 52 and through passages 42 in venturi housing 36 and venturi openings 40 in venturi 38 into the central opening 54. In the chamber 52, the air will be intimately mixed with the gasoline vaporized by the transducer 58. The mixture of air and vapor will pass through the openings in the venturi housing 36 and the venturi 38 into the central opening 54 and from the central opening 54 through the duct means 64 in the throttle body 16 to the intake manifold of the internal combustion engine.

The screen 50 covers each of the ports 48 and prevents backfire from the internal combustion engine flowing back through the central opening 54 through the ports 48 into the chamber 52.

The present invention may be adapted for new automobiles as an OEM component. Further, it may be adapted as an after-market device. The venturi housing 36 and the venturi 38 are sized for a particular internal combustion engine. In order to accommodate a different size internal combustion engine, a venturi housing and a venturi with properly sized ports for the different engine may be utilized in place of the existing venturi housing and venturi; that is, a venturi housing and venturi of the same size as that shown but with different passage and venturi openings may be used.

While we have shown a presently preferred embodiment of the present invention, it will be apparent that the invention may be otherwise embodied within the scope of the attached claims.

What is claimed is:

1. A combination gas vaporizer-air filter comprising a housing, fuel supply means for fluid to be vaporized, an ultrasonic transducer in the housing for vaporizing fluid from said fuel supply means, air inlet means in the housing, outlet means in the housing, an air filter in said housing adjacent the air inlet means, the vaporized fluid and air in the housing being intimately mixed prior to discharge from the outlet means, duct means communicating said housing to the intake manifold of an internal combustion engine, the outlet means communicating with said duct means, whereby the mixture of vaporized fluid and air may pass from the outlet means to said duct and then to said intake manifold, venturi means in said housing, said venturi means being disposed in the air passage through said housing downstream from said ultrasonic transducer, and a gas collector body in said housing, said gas collector body having ports in the internal walls thereof and a central opening therethrough, said venturi means including a venturi housing disposed in said central opening.

2. A combination gas vaporizer-air filter as in claim 1 wherein said air filter is annular so that all air entering said housing must first pass through the air filter.

3. A combination gas vaporizer-air filter as in claim 2 wherein said ultrasonic transducer comprises a transducer member and a metal resonator operatively affixed to said transducer member.

4. A combination gas vaporizer-air filter as in claim 1 wherein air from the atmosphere about the combination gas vaporizer-air filter will pass through the air filter and then the venturi means to induce the vaporized fluid from within the housing to enter the air stream flowing to the duct and then to the intake manifold.

5. A combination gas vaporizer-air filter as in claim 4 wherein the fluid is fuel and including float control means for controlling the supply of fuel to said fuel supply means.

6. A combination gas vaporizer-air filter as in claim 5 including pump means and a fuel injector for receiving fuel from said pump means and discharging it onto the ultrasonic transducer.

7. A combination gas vaporizer-air filter as in claim 5 including means for supplying ultrasonic energy to said transducer of at least 1,000,000 Hz.

8. A combination gas vaporizer-air filter as in claim 1 including a valve member for controlling the flow of air through said central opening in the gas collector body.

9. A combination gas vaporizer-air filter as in claim 8 wherein in closed position the valve member will terminate air flow through said central opening during high speed operation, whereby when the valve member is closed, all air entering the housing will pass through the venturi means, and spring means for biasing the valve member away from closed position.

* * * * *